United States Patent [19]
Phillips

[11] Patent Number: 5,483,309
[45] Date of Patent: Jan. 9, 1996

[54] SLIDE PROJECTOR

[75] Inventor: Bernd Phillips, Untergruppenbach, Germany

[73] Assignee: Eastman Kodak Company, Rochester, N.Y.

[21] Appl. No.: 339,851

[22] Filed: Nov. 15, 1994

[30] Foreign Application Priority Data

Nov. 15, 1993 [DE] Germany ............... 43 38 924.4

[51] Int. Cl.⁶ .................................................. G03B 23/02
[52] U.S. Cl. ............................ 353/111; 353/103; 353/112; 353/DIG. 1
[58] Field of Search ............................... 353/103, 104, 353/111, 112, DIG. 1, 117

[56] References Cited

U.S. PATENT DOCUMENTS

| | | | |
|---|---|---|---|
| 2,922,335 | 1/1960 | Lacoe Jr. | 353/112 |
| 3,276,314 | 10/1966 | Robinson . | |
| 3,308,718 | 3/1967 | Autos | 353/112 |
| 3,416,249 | 1/1966 | Millie | 40/79 |
| 3,427,739 | 2/1969 | Robinson | 40/79 |
| 3,453,044 | 1/1967 | Schlessel | 353/116 |
| 4,408,849 | 10/1983 | Sickles | 353/117 |

FOREIGN PATENT DOCUMENTS

| | | |
|---|---|---|
| 949528 | 9/1956 | Germany . |
| 1285205 | 1/1968 | Germany . |
| 1547205 | 12/1969 | Germany . |

*Primary Examiner*—William C. Dowling
*Attorney, Agent, or Firm*—Peter J. Bilinski

[57] ABSTRACT

A slide projector having a chute (37) for feeding slides (21, 24) to be projected to a projection gate and also having a stack loader (9) with a first and a second storage chamber (17 and 19), each to take a stack of slides which are in contact with one another. The stack loader (9) has a movable receiving member (31) with two slide compartments (35 and 36), wherein the receiving member serves as a movable intermediate tray whose slide compartments can be selectively aligned with the opening of the chute (37) and can be selectively loaded and unloaded again with an end slide (21, 24) of the stack of slides in one of the storage chambers (17 or 19) by a series of friction wheels (47, 49, 61, 63).

11 Claims, 5 Drawing Sheets

SLIDE PROJECTOR

FIELD OF THE INVENTION

The invention relates to a slide projector with a chute for feeding a slide to be projected to the projection gate, a projector drive for actuating a movable arm for ejecting the slide in the chute out of said chute, a stack loader adapted to be mounted above the opening of the chute and having a first and second storage chamber each to hold a stack of slides which are in contact with one another, a feeding device for pushing the stack of slides in at least one of the storage chambers relative to the opening of the chute and into a position in which the end slide of the stack is movable out of said storage chamber as the slide to be projected and into the chute and in which a projected slide is movable out of the chute by the arm and into the other storage chamber.

BACKGROUND OF THE INVENTION

Slide projectors with a chute to feed the slides to the projection gate under the effect of gravity and with a driven arm to move the slide out of the upper opening of the chute are already known. Such projectors are frequently operated in conjunction with a circular tray mounted on top of the projector which has slide compartments open on the underside and which can be aligned with the chute, see U.S. Pat. No. 3,276,314.

A known slide projector of the generic type, see DE-AS 1 285 205, offers the user the possibility of projecting slides automatically without previously having to load the slides into a slide tray. With this known projector it is only necessary to place a stack of slides which are in contact with one another into the one storage chamber of the stack loader which is mounted above the chute instead of a tray. When the slides have been projected, the stack of slides can then be taken out of the second storage chamber of said loader.

Although this known projector relieves the user of the necessity for loading the slides into a tray, a projector of this type has certain limitations with respect to its universal applicability. For example, it is not possible to project the slides "backwards", as slides already projected and loaded into the second storage chamber cannot be projected a second time without being taken out of the second storage chamber and placed into the first storage chamber again. The above known projector is not suitable either for the projection of slides of different thicknesses, for example slides with different mounts.

SUMMARY OF THE INVENTION

It is the object of the invention to create a slide projector of the type in question which, in contrast to such known projectors, is characterized by universal applicability.

Using a slide projector of the type described at the beginning, this object is attained according to the invention in that the stack loader has at least first and second slide receiving members, each with slide compartments open on the underside, which is movable relative to the chute and by the projector drive in order to selectively align the bottom opening of one of the slide compartments with the opening of the chute, and that the projector has transport means controllable in response to the movement of said receiving member, by which transport means the end slide to be projected in a chosen storage chamber can be selectively loaded into the one slide compartment and a slide in the other slide compartment can be removed from said compartment and returned as the end slide to the stack in the other storage chamber.

The movable stack loader with two slide compartments according to the invention forms, in effect, a movable intermediate tray which is located between the two storage chambers and can be automatically loaded and unloaded by the controllable transport means. Since the receiving member can be moved relative to the chute in order to align either the one or the other slide compartment with the chute, the projector according to the invention is operated in the same way as with a conventional tray, for example a circular tray, with the user, however, being relieved of the job of loading the slides into the tray, as the "intermediate tray" formed by the receiving member is automatically loaded and unloaded. Forward and reverse projection is thus possible in the same way as with a conventional tray, such as a circular tray. Since the projector is operated practically from an "intermediate tray" there are no problems with respect to the projection of slides of different thicknesses, as is the case with normal trays, for example circular trays, into the slide compartments of which (designed for maximum thickness of the slides) thinner slides can also be loaded and projected without problems.

In an advantageous embodiment of the projector, the storage chambers of the stack loader are designed to hold a horizontal stack of upright slides and offset laterally from the slide compartments of the receiving member by a horizontal distance measured transversely to the feed direction of the feeding device. With this configuration, the insertion and return of slides into and out of the slide compartments is effected by horizontal movement of the last slide in the stack in the one or other storage chamber. This type of horizontal movement can be assured simply and trouble-free, even if slides of different thicknesses are to be handled.

With embodiments of this type, the configuration can be such that the transport means comprises at least one drivable friction wheel which is arranged with its vertical axis of rotation between the ends of the two storage chambers facing each other so that the end slides of the stacks in each storage chamber can be brought into frictional contact with the friction wheel by the feed effect of their feeding device. Simply by reversing the direction of rotation of the friction wheel, a frictional force can be exerted on the end slide in the one or other storage chamber so that the slide is moved in transport direction towards the receiving member.

In the case of embodiments in which a partition of the receiving member between the two slide compartments extends with its wall sections adjacent to the lateral openings of the slide compartments into the space between the end slides held apart by the friction wheel, the configuration can be such that as a result of the movements of the receiving member relative to the chute the partition can be adjusted into such positions that the partition in conjunction with the friction wheel forms a transport path for the one or other end slide, the change in position of the receiving member effecting the necessary change in the transport path of the transport means for the transport of either the one or the other end slide, which results in a considerable simplification in the design of the control and synchronization means.

The transport means preferably comprise several additional friction wheels arranged such that, depending on the position of the partition of the receiving member, they continue the transport path for the one or other end slide into the slide compartments of said receiving member.

With particularly favorable embodiments, the transport means are configured such that the slides to be transported are transported in their transport paths so that the end slide in each case is tilted slightly at an angle relative to the main plane of the slides in the stack shortly after having been drawn from the stack and is then transported at this angle, i.e. in a plane slightly inclined relative to the vertical plane, the angle of inclination being simply selected small enough to allow the slide to pass without difficulty through the lateral openings of the compartments in the receiving member. During transport, this slight inclination relative to the vertical plane reduces the friction between the end slide and the next slide in the stack and, at the same time, prevents the risk of jamming such as can occur, for example, at the edges of glassless cardboard mounts when such mounts are slightly bowed.

The tilting of the slide to be transported can be achieved in that the sections of the partition of the receiving member defining the transport paths form inclined surfaces relative to the vertical plane of the end slides in the stack, and that at least the friction wheel which, in conjunction with the partition of the receiving member, defines the transport path for the slide in question shortly after the start of the transport operation, has a conical outer surface whose inclination is matched to that of the associated sections of the partition.

The other friction wheels continuing the transport paths into the slide compartments also preferably have conical outer surfaces. A resilient element can be provided in the area of the transport path between the conical friction wheel outside the receiving member and the further friction wheels continuing the transport paths into the slide compartments, said element applying spring-pressure to the end slide to be transported in such a way that the tilting out of the original vertical plane is assisted and the slide is held by spring force against the corresponding inclined section of the partition of the receiving member.

In the following the invention will be described in detail with reference to an embodiment as illustrated in the drawings.

DETAILED DESCRIPTION OF THE INVENTION

Figure 1:
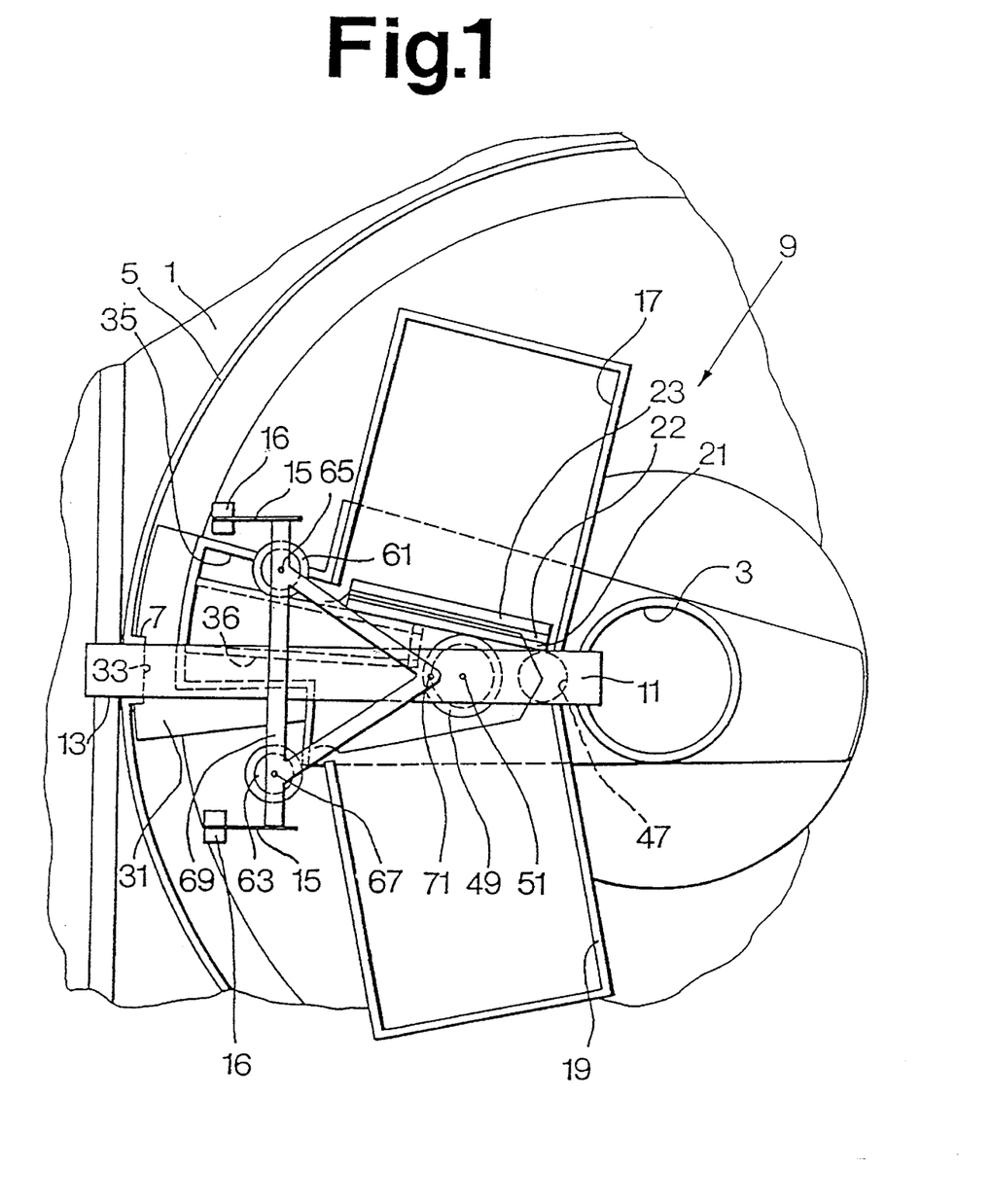
FIG. 1 is a simplified partial view of the upper side of a slide projector which can be operated with a circular tray, shown, however, with a mounted stack loader with two storage chambers, each to take one stack of slides, instead of the circular tray.
Figure 2:
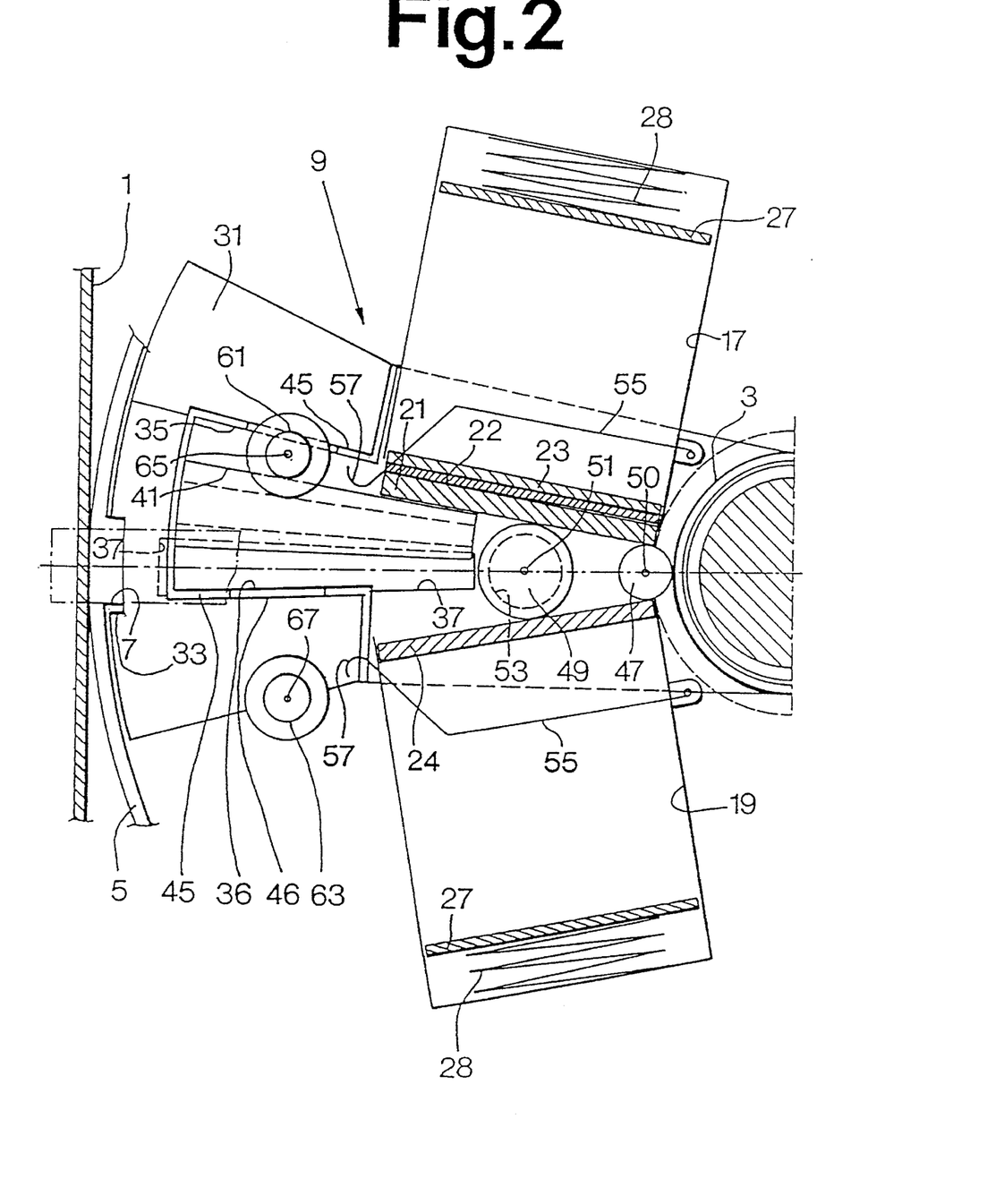
FIG. 2 is a simplified horizontal, sectional view of the part of the embodiment according to FIG. 1, but on a slightly larger scale than FIG. 1.
Figure 3:
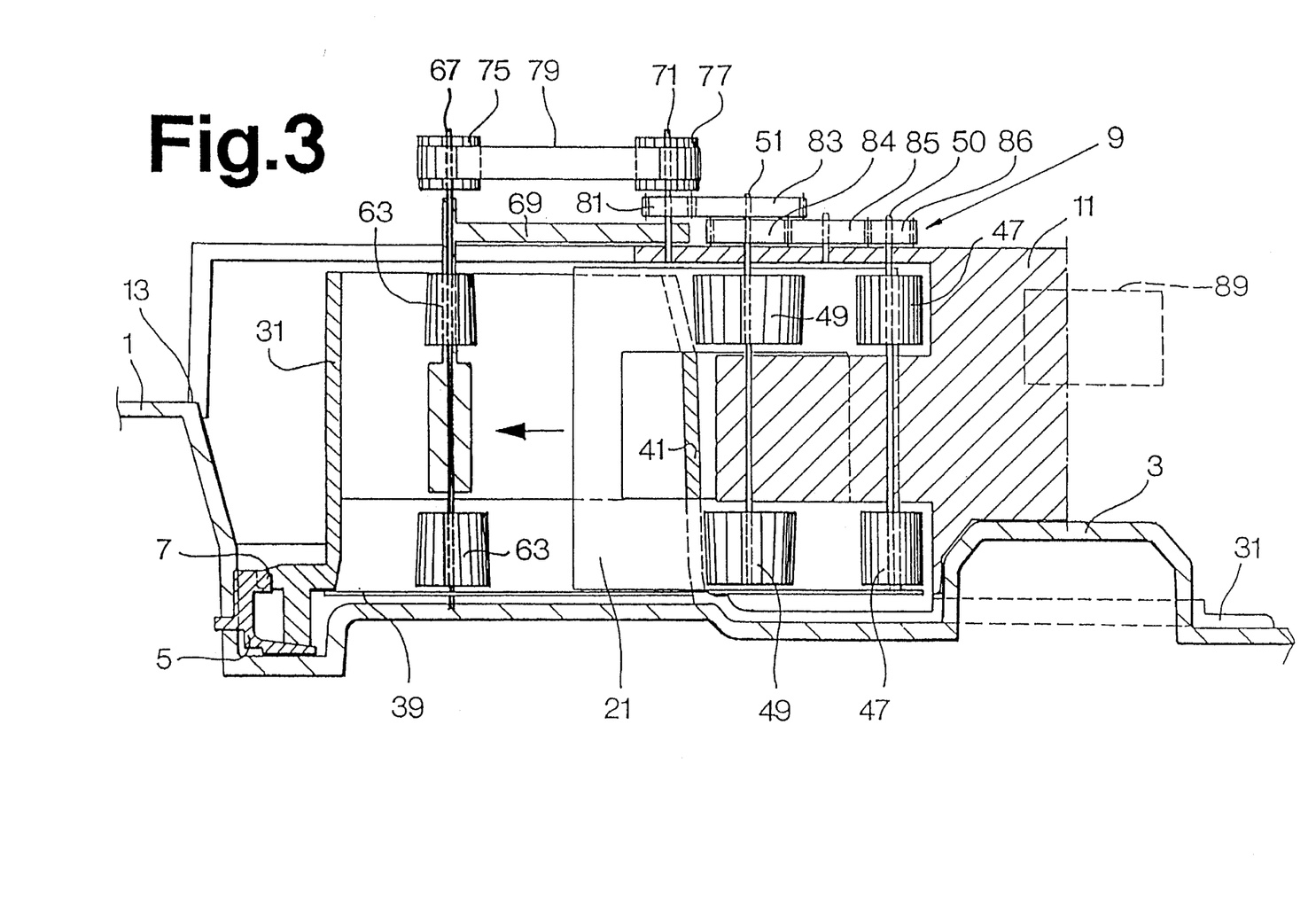
FIG. 3 is a simplified vertical, sectional view of the corresponding part of the embodiment, but again on a slightly larger scale than FIG. 2.
Figure 4:
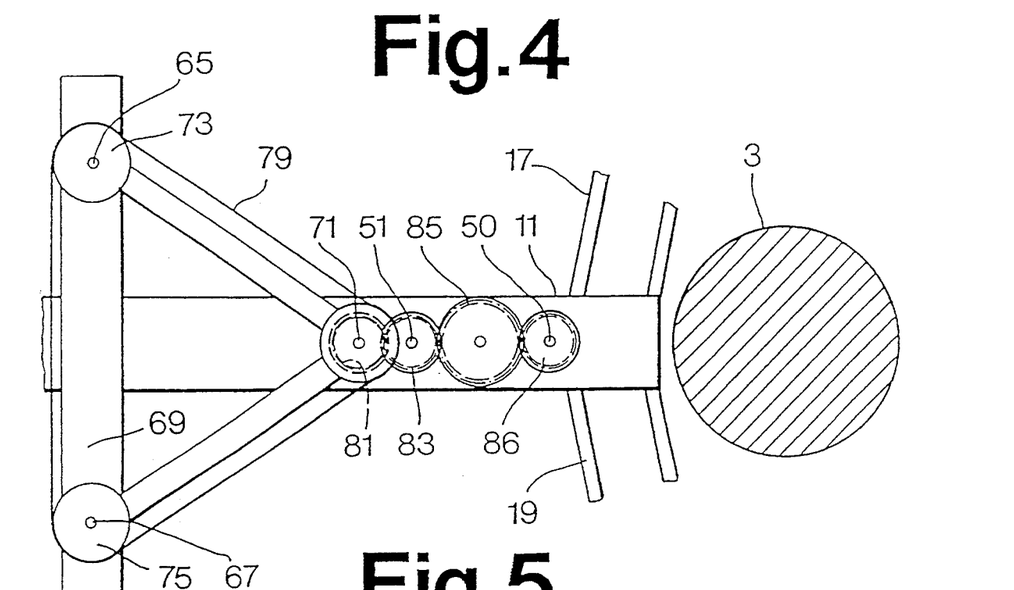
FIG. 4 is a considerably simplified partial top view of part of the drive system for the transport means of the embodiment.

FIGS. 1 to 3 show part of the upper side 1 of a slide projector suitable for operation with a circular slide tray which can be mounted on the upper side 1 so as to rotate about a central journal 3. In the drawings, the projector is shown without a circular tray being mounted. FIGS. 1 to 3 show a drive ring 5 which belongs to the projector drive, is concentric with the journal 3 and forms an entraining member 7 protruding radially inwards for driving a mounted circular tray (not shown) in a rotary manner about journal 3.

A stack loader mounted on the upper side 1 of the projector instead of the circular tray, is shown as a whole in FIGS. 1 to 3 and designated 9. It has a base portion 11 which can be positioned at one end on journal 3 and can be removably fixed to the upper side 1 of the projector by connecting elements (not shown), the end of the base portion 11 furthest from journal 3 being supported on the upper side 1 of the projector at 13, and leaf springs 15 whose function will be explained in further detail below being secured to the upper side 1 by anchoring elements 16.

The walls of a first storage chamber 17 and a second storage chamber 19, each of which holds a stack of slides which are in contact with one another and are in an upright position when the projector is operated, are molded onto the base portion 11. Of these slides, FIG. 2 shows in storage chamber 17 one end slide 21 facing the opening of the chute 37 and two other slides 22 and 23 following slide 21, as well as just one end slide 24 in storage chamber 19. FIG. 1 shows only slides 21 to 23 in storage chamber 17. Each storage chamber 17 and 19 has a shiftable pressure plate 27 which is moved by a pressure spring 28 and serves as a feeding device for the feeding movement of the slide stacks in the storage chambers, see FIG. 2. A receiving member 31 is rotatably mounted about the journal 3 relative to the base portion 11. The receiving member 31 is, in a sense, comparable with a segment of a circular tray rotating about the journal 3 and has a groove 33 in its end section furthest from the journal 3 into which the entrainment member 7 of the drive ring 5 engages so that the receiving member 31 can be pivoted by the projector drive. The receiving member has only two slide compartments, namely a first slide compartment 35 and a second slide compartment 36. When the stack loader 9 is mounted on the upper side 1, the projector drive can be programmed by appropriate means in such a way that the receiving member 31 is pivoted via the drive ring 5 such that, depending on the requirements for the operation of stack loader 9, slide compartment 35 or slide compartment 36 are aligned with the chute 37 (see FIG. 2) which leads to the projection gate of the projector. Slide compartments 35 and 36 of the receiving member 31 are open at the bottom, however, as with a conventional circular tray, the compartments have a baseplate 39, see FIGS. 3 and 6 which is movable relative to receiving member 31 and can be fixed in position on the upper side 1 of the projector in such a way that an opening in the baseplate 39 (not illustrated in the drawing) covers the upper opening of the chute 37 so that when a slide compartment 35 or 36 is aligned with the chute 37, a slide in the slide compartment drops under the effect of gravity into the chute and the projection gate. During operation, a slide lifting arm in the chute (not shown in the drawing) which in the case of "chute-type projectors", is usually actuated by the projector drive, lifts a projected slide out of the chute and into the slide compartment 35 or 36 above the opening in the baseplate 39 and holds said slide in a raised position until the compartment has turned relative to the opening in the baseplate 39.

Between slide compartments 35 and 36, the receiving member 31 has a partition 41 whose side walls 43 are inclined at an angle relative to the vertical plane which is perpendicular to the horizontal upper side 1 of the projector. In order to illustrate this more clearly, the angle of inclination is exaggerated in FIG. 6. At the free end facing towards the journal 3, the inclined side walls 43 of the partition 41 together with the outer walls 45 and 46 of the slide compartments 35 and 36, respectively, each define a lateral loading and unloading opening of each slide compartment 35, 36.

In the case of the present embodiment, transport means which transports the end slide 21 or 24 of storage chambers 17 or 19 through the lateral loading and unloading openings of compartments 35, 36 in a horizontal sliding movement take the form of a friction wheel arrangement. Said arrangement comprises a first friction wheel 47 and a second friction wheel 49 which are mounted on the base portion 11 via a vertical fulcrum 50 and 51, respectively, in such a way that they are located between the two end slides 21 and 24 of the storage chambers 17 and 19, respectively, the first friction wheel 47 being furthest from the slide compartments 35, 36 and cooperating with the end edge of the end slides 21, 24 furthest from the slide compartments 35, 36. The second friction wheel 49 is located in the vicinity of the radially inner end of the partition 41 and has a larger diameter than the first friction wheel 47, the difference in diameter being such that the end slides 21 and 24 in contact with the friction wheels 47 and 49 are positioned at least approximately in radial planes in relation to the central journal 3 of the projector. Thus the longitudinal axes of the stacks of slides in the storage chambers 17 and 19 do not extend in the same directions but are inclined towards each other. The feeding device in each of the storage chambers 17 and 19, consisting of pressure plate 27 and pressure spring 28, urges the stack of slides in the chamber forward and thus the end slide 21 and 24 in each stack into frictional contact with the friction wheels 47 and 49.

Figure 6:
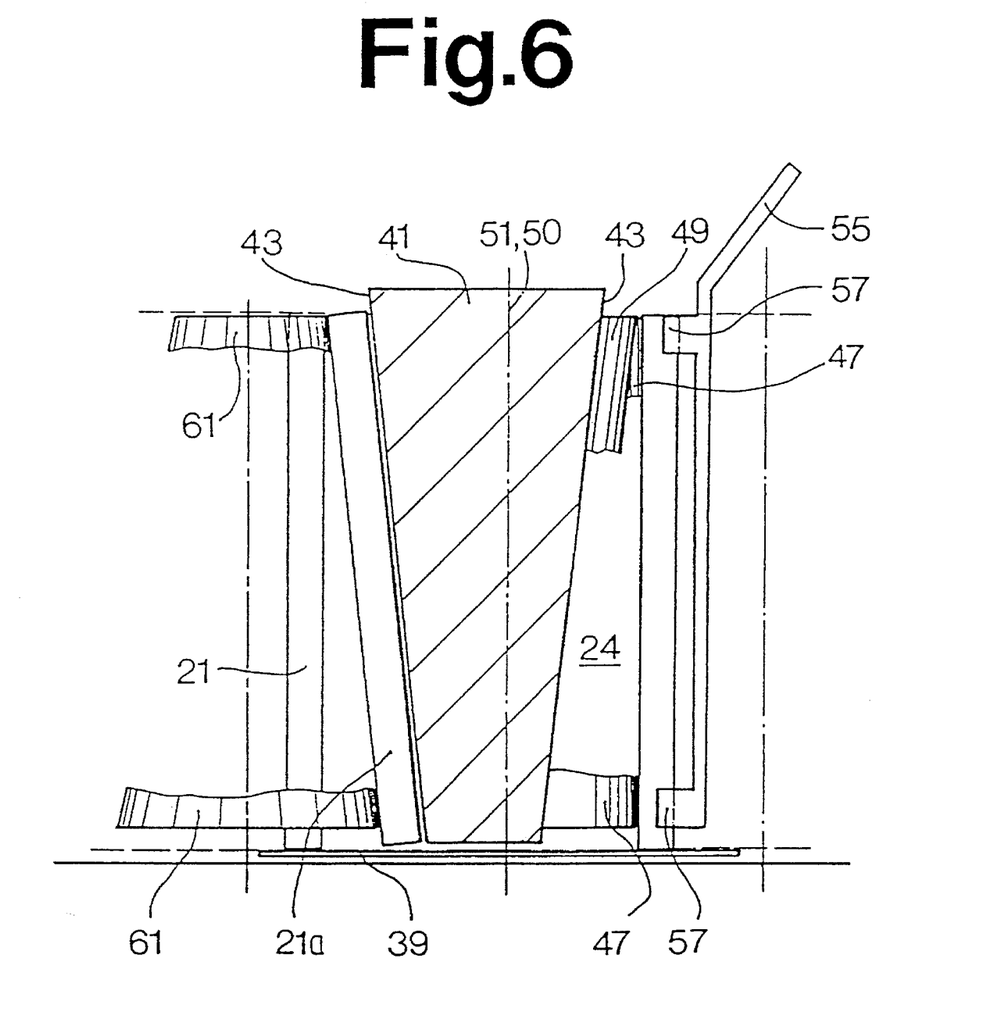
FIG. 6 is a considerably simplified partial and sectional view of parts of the transport paths of the transport means of the embodiment, shown on a larger scale.

The friction wheel 47 which is in contact with the end edge area of the end slides 21 and 24 and is divided into an upper and a lower friction roller has a cylindrical outer surface, the upper and lower friction rollers having identical diameters so that the end slide 21, 24 in contact with the friction wheel 47 is held in its vertical plane. In contrast, the second friction wheel 49 which is also divided into an upper and a lower friction roller has a conical outer surface, the orientation of the cone angle being such that the lower friction roller has the smaller diameter. As long as the end slide 21, 24 is in its initial position in the stack where it is supported by the first friction wheel 47, only its upper edge rests against the upper friction roller of friction wheel 49, see FIGS. 1 and 2, where the largest circumference of the lower friction roller of friction wheel 49 is shown in dotted lines and designated 53. As soon as the friction wheels 47 and 49 are turned in the same direction by a drive means described in more detail below, the one or other end slide 21, 24 starts to move horizontally towards one of the two slide compartments 35, 36. If the friction wheels 47, 49 turn in counter-clockwise direction, it is slide 21 which carries out this movement. With this transport movement of slide 21 and with the operating position and setting of the receiving member 31 as shown in FIG. 2, the lateral opening of the slide compartment 35 is aligned with slide 21. As soon as the trailing edge of slide 21 leaves friction wheel 47 and the further drive of the transport movement is performed by the second friction wheel 49, the slide is no longer fully supported in the vertical plane so that tilting out of the vertical is possible. During this operation, the lower edge of the slide comes into contact with the lower friction roller of the conical friction wheel 49. This tilting which causes the slide (21a in FIG. 6) performing the transport movement to come into full contact with opposite side wall 43 of partition 41 of receiving member 31, is assisted by a spring-loaded separating element 55 which is assigned to each of the storage chambers 17 and 19 and has resilient fingers 57, against which the slide 21a runs during its transport movement. Said slide is thus resiliently held against side wall 43 which defines the transport path leading into the appropriate slide compartment 35 or 36. The right-hand side of FIG. 6 shows fingers 57 in their starting positions before being contacted by the end slide 24 which is still in its initial position in storage chamber 19, whilst fingers 57 of the separating element 55 belonging to the other storage compartment 17 which resiliently act on the slide 21a during its transport movement are not shown on the left-hand side of FIG. 6.

Figure 5:
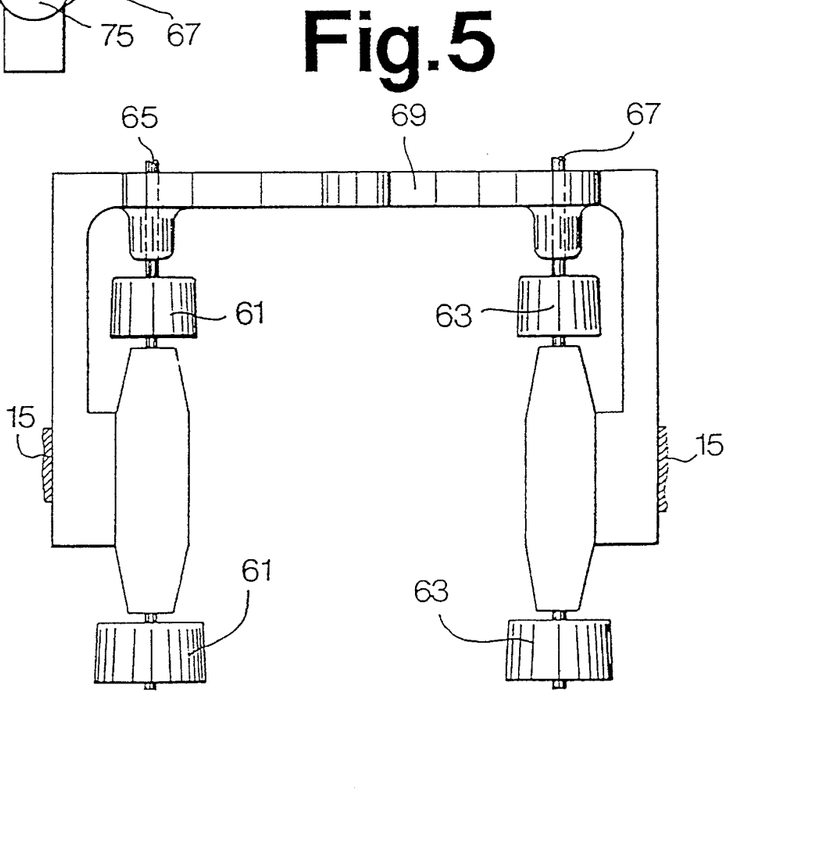
FIG. 5 is a partial view of a bearing arm of a friction wheel arrangement for the transport means of the embodiment.

As a continuation of the transport path of the transport means within the area of the receiving member 31, a further third friction wheel 61 and a further fourth friction wheel 63 are provided which are also divided into an upper and lower friction roller with vertical rotation axles 65 and 67 and have conical outer surfaces, the cone angle, as in the case of the second friction wheel 49, being adapted to the angle of inclination of the side walls 43 of partition 41. In the case of these friction wheels 61 and 63 which can extend into the inner area of receiving member 31 through openings in the outer walls 45 and 46 of slide compartments 35 and 36, the lower friction roller has a larger diameter than the upper friction roller. As can best be seen from FIGS. 1 and 3 to 5, the friction wheels 61 and 63 are arranged on a rocker arm 69 which is mounted on the base portion 11 for horizontal pivoting movement about a vertical pivot shaft 71. As can be seen from FIGS. 1 and 5, the aforementioned leaf springs 15 engage both sides of the rocker arm 69 to hold it in a central pivoting position, from which it is movable in both pivoting directions against spring force.

The friction wheels 61 and 63 can be driven in a common direction of rotation by a toothed belt arrangement consisting of the toothed belt pulleys 73 and 75 mounted on shafts 65 and 67 of friction wheels 61 and 63, respectively, and a toothed belt pulley 77 which is mounted on pivot shaft 71 and over which a toothed belt 79 is driven. A toothed pinion 81 linked to pulley 77 meshes with a gear wheel 83 mounted on the fulcrum 51 of the second friction wheel 49 so that the rotating movement of the friction wheel 49 is transmitted to the toothed belt arrangement of rocker arm 69. The fulcrum 51 of the second friction wheel 49 is driven via a gear wheel 84 mounted on said fulcrum, an intermediate gear wheel 85 and a gear wheel 86 which is mounted on shaft 50 of the first friction wheel 47 so that a closed gear chain is created from the first friction wheel 47 to the toothed belt arrangement of rocker arm 69. A drive motor 89 indicated only schematically in FIG. 3 is connected via a gear linkage (not shown) to the gear wheel 86, which consequently forms the primary drive element for the transport means. When stack loader 9 is mounted on the upper side 1 of a projector, connecting elements not only serve to hold in position the base portion 11 and the anchoring elements 16 of the leaf springs 15 and to provide the line connections for the power supply to the motor 89, but also transmit programming commands for the processor of the projector drive control so that the drive/rotating movements of the drive ring 5 are performed in the manner necessary for the operation of stack loader 9.

When the projector is operated in forward direction with a stack of slides in storage chamber 17, of which FIGS. 1 and 2 show only the end slide 21 and two subsequent slides 22 and 23 each of which has a different thickness compared with slide 21, the drive ring 5 and thus the receiving member 31 are in their rotation positions shown in FIGS. 1 and 2 in which the lateral loading and unloading opening of the empty slide compartment 35 is aligned with the end slide 21 and the second empty slide compartment 36 of the receiving member 31 is aligned with the opening in the baseplate 39, which in turn is aligned with the upper opening of the chute 37. In order to initiate the transport operation for the end slide 21 to be projected, the transport means are started so that the first and second friction wheels 47 and 49, respectively, rotate counter-clockwise. Via the gear chain shown in FIGS. 2 to 4 and the toothed belt arrangement of the rocker arm 69, this rotating movement effects a rotating movement of the third and fourth friction wheels 61 and 63, respectively, in clockwise direction. The frictional contact with the friction wheels 47 and 49 results in a shift of slide 21 relative to the adjacent slide 22, with the leading edge of the slide moving into contact with the resilient finger 57 whilst the trailing edge of the slide disengages the first friction wheel 47 so that the slide tilts out of the vertical plane. This not only reduces the frictional contact between slide 21 and the adjacent slide 22 produced by the feeding effect of the feeding device comprising spring 28 and pressure plate 27, but also prevents possibly bowed parts of the slide mount from jamming. When the leading edge of the slide contacts the third friction wheel 61 which extends into the slide compartment 35 through lateral openings in the outer wall 45, transport of the slide is continued along the inclined side wall 43 of partition 41, with the slide assuming the position indicated by slide 21a in FIG. 6 until it is stopped by its leading edge running up against the radially outer end wall of slide compartment 35. The projector drive now rotates the drive ring 5 counterclockwise until the loaded slide compartment 35 is aligned with the opening in the baseplate 39 and thus with the opening of chute 37. The slide arm in the chute 37 moves downwards so that the slide 21 can drop to the projection gate under the force of gravity. After the slide has been projected, the slide arm lifts the projected slide 21 in the chute 37 upwards. Before this happens, the receiving member 31 is moved back via the drive ring 5 by clockwise rotation until the slide compartment 36 is aligned with the chute 37 and the opening in the baseplate 39. The slide arm now lifts the projected slide 21 into the slide compartment 36. With the receiving member 31 in the position according to FIG. 2, the friction wheels 47, 49 and 61 transport the new end slide 22 in storage chamber 17 into the now empty slide compartment 35, so that a situation is now obtained in which the slide compartment 35 is loaded again and the previously projected slide placed in slide compartment 36.

The next operating step is the backward rotation of the receiving member 31 in counter-clockwise direction via the drive ring 5 in order to align the newly loaded slide compartment 35 with the chute 37, the previously projected slide 21 in slide compartment 36 now coming into frictional contact with the friction wheel 63 driven in clockwise direction which extends into the slide compartment 36 through openings in the outer wall 46. The previously projected slide 21 is thus moved to the right (when looking as shown in FIG. 2) along the side wall 43 of partition 41 until it comes into frictional contact with the second friction wheel 49 rotating in counterclockwise direction and finally with the friction wheel 47 rotating in the same direction. This slide 21 has thus now become the end slide in the stack in storage chamber 19.

By reversing the direction of rotation of the friction wheels a corresponding operating cycle for the transport of the end slide 24 from the stack in the other storage chamber 19 is effected when the drive ring 5 causes the receiving member 31 to move back and forth in a coordinated manner. In other words, the operating cycle in the reverse direction is analogous with the operation in the forward direction previously described. Since the partition 41 of the receiving member 31 which, with its side walls 43, defines the transport paths into and out of the slide compartments 35 and 36, extends into the gap between the ends of the stacks of slides in storage chamber 17 and in storage chamber 19 where the end slides 21 and 24, respectively, are held apart by contact with the friction wheels 47 and 49, the slide unloaded from the corresponding slide compartment 35 or 36 and transported back to the stack of slides automatically finds its place in the stack in that the adjacent slide is pushed back against the force of the feeding device in the corresponding storage chamber 17 or 19. This operation takes place irrespective of whether the slide has a thick glass, mount or a glassless thin mount. Since the rocker arm 69 with the friction wheels 61, 63 engaging the slide compartments 35 and 36 are resiliently mounted by leaf springs 15, frictional contact between the friction wheels and the slide in the slide compartment 35 or 36 is made due to the adjustment movements of the receiving member 31, irrespective of the thickness of the slide, so that trouble-free transport is assured even with different slide mount thicknesses.

What is claimed is:

1. A slide projector comprising a chute (37) having a chute opening for feeding a slide (21, 24) to be projected to a projection gate, a projector drive for actuating a movable arm for ejecting a slide in the chute (37) out of said chute, a stack loader (9) adapted to be mounted above the opening of the chute and having a first and second storage chamber (17 and 19) each said chamber being capable of holding a stack of slides which are in contact with one another, and a feeding device (27, 28) for pushing the stack of slides in at least one of the storage chambers relative to the opening of the chute (37) and into a position in which the end slide (21, 24) of the stack is movable out of said storage chamber as the slide to be projected and into the chute (37) and in which a projected slide is movable out of the chute (37) by the arm and into the other storage chamber, is characterized in that:

the stack loader (9) includes a slide receiving member (31) having at least a first and a second slide compartment (35, 36) open on the underside, which is movable relative to the chute (37) and by the projector drive in order to align the opening in the bottom of one of the slide compartments (35, 36) with the opening of the chute (37), and that transport means (47, 49, 61, 63) are provided which are controllable in response to the movement of the receiving member (31), by which said transport means the end slide (21, 24) to be projected of the stack in a selected storage chamber (17, 19) can be inserted into the one slide compartment (35, 36) and a slide in the other slide compartment (35, 36) can be removed from said compartment and returned as the end slide to the stack in the other storage chamber (17, 19).

2. The slide projector according to claim 1, wherein the storage chambers (17, 19) of the stack loader (9) are designed to hold a horizontal stack of upright slides and are laterally offset from the slide compartments (35, 36) of the receiving member (31) by a horizontal distance measured transversely to the feed direction of the feeding device (27, 28), wherein the sides of the slide compartments (35, 36) facing the laterally offset storage compartments (17, 19) each have a lateral opening for the insertion and removal of a slide and in which the transport means (47, 49, 61, 63) can be actuated to selectively push a slide either into or out of the lateral openings of the slide compartments (35, 36).

3. The slide projector according to claim 2, wherein the transport means has at least one drivable friction wheel (47, 49) located with a vertical fulcrum (50 and 51, respectively) between the two facing ends of the two storage chambers (17 and 19) in such a way that the end slides (21, 24) of the stacks in the two storage chambers (17, 19) can be brought into frictional contact with the drivable friction wheel (47, 49) by the feeding effect of their feeding device (27, 28).

4. The slide projector according to claim 3, wherein a partition (41) of the receiving member (31) between the two slide compartments (35, 36) extends with its wall sections (43) adjacent to the lateral openings of the slide compartments into the space between the end slides (21, 24) which are held apart by the friction wheel (47, 49) and that as a result of the movements of the receiving member (31) relative to the chute (37), the partition (41) is adjustable into positions within the space between the two end slides (21, 24) such that the partition (41) in cooperation with the friction wheel (47, 49) forms a transport path for the one or other end slide (21 or 24).

5. The slide projector according to claim 4, wherein the transport means in the space between the end slides (21, 24) of the two slide stacks have a first (47) and a second (49) friction wheel with a vertical fulcrum (50 and 51, respectively) and outside said space have a third and fourth friction wheel (61 and 63, respectively) which also have a vertical fulcrum, said friction wheels being located in such a way that, depending on the position of the partition (41) of the receiving member (31), said friction wheels continue the transport paths for either the one or the other end slide in the slide compartments (35, 36) of the receiving member.

6. The slide projector according to claim 5, wherein the wall sections (43) of the partition (41) of the receiving member (31) defining the transport paths form surfaces inclined relative to the vertical plane of the end slides (21, 24) in the stack, and in which the friction wheel (49) nearest to the partition (41) in the space between the end slides (21, 24) has a conical outer surface whose cone angle is adapted to the inclination of the wall sections (43) of the partition (41).

7. The slide projector according to claim 6, wherein the third and fourth friction wheels (61 and 63) have conical outer surfaces with adapted cone angles.

8. The slide projector according to claim 6, wherein the first friction wheel (47) in the space between the end slides (21, 24) of the two stacks in the vicinity of the edge of the end slide (21, 24) furthest from the partition (41) has a cylindrical outer surface holding the slide in its vertical plane and that a resilient separating element (55, 57) is provided along the transport path of each end slide (21, 24), said separating element trying to tilt the transported slide out of its vertical plane as it leaves the first friction wheel (47).

9. The slide projector according to claim 8, wherein the first and second friction wheels (47 and 49) positioned in the space between the end slides (21, 24) are drivable in the same direction of rotation and the third and fourth friction wheels (61, 63) positioned outside said space are both drivable in an opposite direction of rotation relative to the direction of rotation of the first and second friction wheels.

10. The slide projector according to claim 5, wherein the third and fourth friction wheels (61, 63) are mounted on rotation axles (65 and 67) shiftable in the horizontal direction against the force of a spring (15).

11. The slide projector according to claim 1, for use with a projector operable with a circular tray, wherein the receiving member (31) is designed in the form of a segment of a circular tray, said segment being pivotable about a central journal (3) for the circular tray by means of the drive element (5) of the projector drive intended for the actuation of the circular tray.

* * * * *

UNITED STATES PATENT AND TRADEMARK OFFICE
CERTIFICATE OF CORRECTION

PATENT NO. : 5,483,309
DATED : January 9, 1996
INVENTOR(S) : Bernd Philipps

It is certified that error appears in the above-indentified patent and that said Letters Patent is hereby corrected as shown below:

On the title page:

Item [75] Inventor: delete "Bernd Phillips and insert---Bernd Philipps---

Signed and Sealed this

Fourth Day of March, 1997

Attest:

BRUCE LEHMAN

Attesting Officer     Commissioner of Patents and Trademarks